A. KLADIVA.
THERMOSTATIC REGULATOR FOR INCUBATORS.
APPLICATION FILED JULY 13, 1916.
1,228,568.
Patented June 5, 1917.
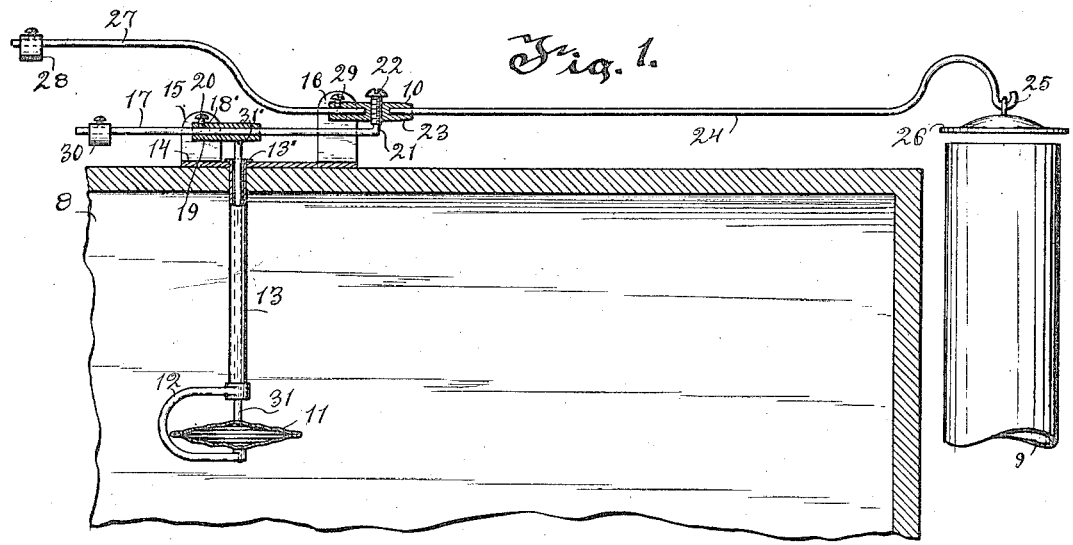
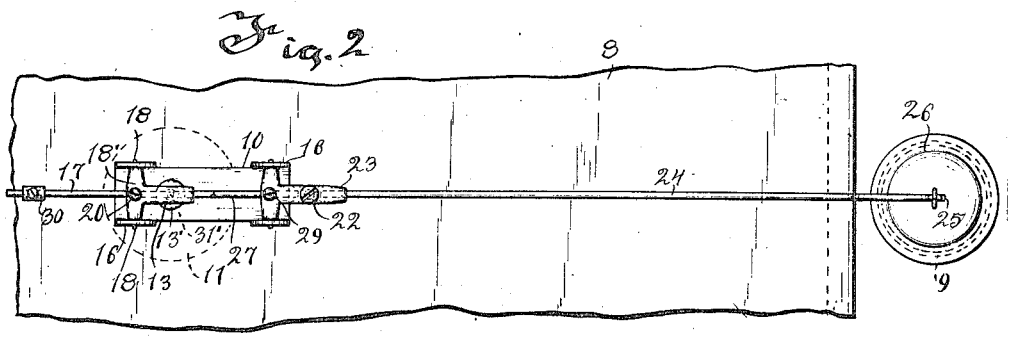
INVENTOR
Alois Kladiva
By Morsell, Keeney & French
ATTORNEYS

UNITED STATES PATENT OFFICE.

ALOIS KLADIVA, OF KENOSHA, WISCONSIN.

THERMOSTATIC REGULATOR FOR INCUBATORS.

1,228,568.     Specification of Letters Patent.     Patented June 5, 1917.

Application filed July 13, 1916. Serial No. 108,982.

*To all whom it may concern:*

Be it known that I, ALOIS KLADIVA, a subject of the Emperor of Austria-Hungary, and resident of Kenosha, in the county of Kenosha and State of Wisconsin, have invented new and useful Improvements in Thermostatic Regulators for Incubators, of which the following is a description, reference being had to the accompanying drawings, which are a part of this specification.

This invention relates to improvements in thermostatic regulators for incubators.

Incubators are usually heated with lamps and the temperature within the incubator is controlled by a thermostatic device which regulates the position of a damper controlling the discharge of heated air from the chimney of the lamp. Thermostatic devices now on the market permit of but a very limited movement of the damper and consequently the temperature of the incubators cannot be maintained to a uniform degree to produce the best results.

It is one of the objects of the present invention to overcome the before mentioned objectionable feature and provide a thermostatic regulator for incubators which has a wide range of movement thus permitting a very fine regulation of the damper and the maintenance of a more uniform temperature in the incubator.

A further object of the invention is to provide a thermostatic regulator for incubators having convenient means for adjustably regulating the position of the damper to get the desired heat regulation.

A further object of the invention is to provide a thermostatic regulator for incubators which is of simple construction, is strong and durable and which may be manufactured at a minimum amount.

With the above and other objects in view the invention consists of the improved thermostatic regulator for incubators and its parts and combinations as set forth in the claims, and all equivalents thereof.

In the accompanying drawing in which the same reference characters indicate the same parts in all of the views:

Figure 1 is a vertical sectional view of an incubator and a side view of a portion of the chimney of the heating lamp provided with the improved thermostatic regulator; and Fig. 2 is a top view thereof, one of the levers being broken off.

Referring to the drawings the numeral 8 indicates a portion of an incubator, 9 the chimney or flue of the heater thereof and 10 the improved regulator. The regulator comprises a diaphragm expansion member 11 positioned within the incubator and supported upon the curved arm 12 forming part of the vertically extending tubular member 13 which depends through the top portion of the incubator. The upper end of the tubular member 13 also extends through a lever supporting member 14 mounted on the upper portion of the incubator and is provided with an annular flange 13' at its upper end portion which bears against the upper face of the lever supporting member. This lever supporting member 14 is formed of sheet metal and is provided with pairs of upstanding eyed ears 15 and 16. A main lever 17 positioned between the ears 16 and 17 is provided with trunnions 18 which extend through the eyes of the ears 16 and pivotally connects the lever thereto. The trunnion member 18' of the lever is formed separate from the lever and is provided with a transversely extending opening 19 through which the lever extends. A screw 20 threaded into the trunnion member and impinging against the lever holds said lever in adjusted position. The forward end 21 of said lever is bent upwardly and bears against the lower end of an adjusting screw 22 which is threaded through a T-shaped trunnion member 23 positioned between and journaled in the ears 16 of the supporting member 14. A compound lever rod 24 mounted in the forward end portion of the T-shaped trunnion projects forwardly therefrom and its outer free end is bent to form a hook 25 for holding the damper 26 suspended therefrom and above the open upper end of the heater pipe 9 before described.

A curved lever rod 27 also projects rearwardly from the T-shaped trunnion and is provided with a counterweight 28 to counterbalance the weight of the damper 26. A screw 29 holds this last mentioned lever rod locked to the trunnion member 22. A counterweight 30 is adjustably mounted on the rear end of the lever 17 to counterbalance said lever.

The diaphragm 11 is positioned axially directly beneath the tubular member 13 and a rod 31 slidably positioned within said tubular member and resting upon the upper wall of the diaphragm has its upper end 31' bearing against the lower portion of the lever 17 at a point adjacent the trunnion member 18' and between said trunnion member and the forward upwardly bent end of said lever so that when the diaphragm expands upwardly the slidable rod will be raised to lift the forward end of the main lever and this lever will in turn swing the forward end of the compound or supplemental lever 24 upwardly to a greater extent than it would be moved with a single lever thus providing a greater range of movement of the valve or damper.

In use the parts are arranged approximately as shown and any change of temperature within the incubator will cause the thermostat to expand or contract and the slidable rod will be moved thereby and also the levers. The plurality of levers will augment the movement of the thermostat to such an extent as to provide a long range of movement of the damper or valve thus permitting a closer adjustment of the temperature of the incubator.

From the foregoing description it will be seen that the thermostatic regulator for incubators is of very simple construction and is well adapted for the purpose described.

What I claim as my invention is:

1. A thermostatic regulator for incubators, comprising a thermostatic member, a movable member engaged thereby, a supporting member formed of sheet metal and having pairs of upturned eyed ears and a depending tubular member which supports the thermostatic member and through which the movable member extends, a tubular trunnion member partially mounted between the ears of one of the pairs of ears, a main lever rod extending through and carried by the trunnion member and having a forward upturned end, said main lever trunnion being engaged by the upper end of the movable member, a T-shaped trunnion member pivotally mounted between the other pair of ears, an adjusting screw carried by the T-shaped member and engaging the upturned end of the main lever, lever rods projecting from the T-shaped member, a heat controlling damper carried by one of the rods, a counterweight mounted on the other rod, and a counterweight mounted on the main lever.

2. A thermostatic regulator for incubators, comprising a supporting member having pairs of upturned eyed ears and a depending tubular portion having a curved lower portion, a thermostat carried by the curved portion, a trunnion member pivotally journaled between one of the pairs of ears and having a tubular extension, a main lever extending through the extension and having an upturned front end and a rear end provided with a counterbalance, another trunnion pivotally mounted in the other ears, a set screw threaded through the last mentioned trunnions and bearing against the upturned end of the main lever, a rod mounted in the last mentioned trunnion and carrying a damper on its free end, and another rod mounted in the last mentioned trunnions and projecting rearwardly therefrom and having a counterweight on its free end.

In testimony whereof, I affix my signature.

ALOIS KLADIVA.